United States Patent [19]

Rosenblum

[11] 3,792,774

[45] Feb. 19, 1974

[54] VIBRATORY SEPARATOR SCREENS

[76] Inventor: Jesse Rosenblum, 112 Roosevelt St., Closter, N.J. 07624

[22] Filed: Apr. 5, 1972

[21] Appl. No.: 241,142

[52] U.S. Cl. ............... 210/495, 210/388, 209/403, 29/208, 29/446
[51] Int. Cl. ............................................. B07b 1/28
[58] Field of Search .... 210/495, 497, 499; 209/403, 209/405, 408, 381; 29/446, 208, 238; 140/109; 156/229, 303.1, 306, 308; 160/371, 392, 395

[56] References Cited
UNITED STATES PATENTS

| | | | |
|---|---|---|---|
| 3,463,315 | 8/1969 | Riesbeck et al. | 209/403 |
| 2,753,897 | 7/1956 | Conrad | 140/109 |
| 3,341,013 | 9/1967 | Moulton | 209/405 |
| 3,214,314 | 10/1965 | Rowbottam | 156/229 |
| 2,271,900 | 2/1942 | Mowbray | 209/403 |
| 1,713,144 | 5/1929 | Overstrom | 209/403 |
| 3,651,947 | 3/1972 | Schollhamer | 210/495 |
| 3,455,367 | 7/1969 | Le Tarte | 160/371 |
| 3,720,256 | 3/1973 | Fralick et al. | 160/392 |

*Primary Examiner*—Samih N. Zaharna
*Assistant Examiner*—Benoit Castel
*Attorney, Agent, or Firm*—Hubbell, Cohen & Stiefel

[57] ABSTRACT

A number of vibratory separator screens which are each assembled in accordance with a multi-stage tensioning method. One specific separator screen, for example, comprises a frame including a continuous groove formed therein and into which a segment of a cloth of desired mesh is driven to thereby mount said cloth to the frame at a desired level of tension.

A multi-stage tensioning method for assembling the specific separator screen above described comprises the steps of tensioning the cloth to a level of tension less than said desired level of tension; positioning the cloth over the frame with a segment of the cloth covering the groove; driving the cloth segment into the groove thereby further tensioning the screen to said desired level; and bonding the screen to the frame at said desired level of tension.

An apparatus for assembling the specific separator screen above described comprises means for tensioning a cloth of desired mesh to a level of tension less than a desired level, and means for driving a segment of the cloth into a continuous groove of a frame thereby further tensioning the cloth on the frame to said desired level of tension.

4 Claims, 19 Drawing Figures

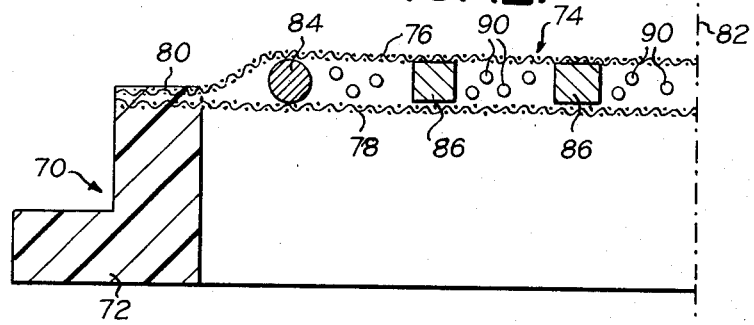
FIG. 12.
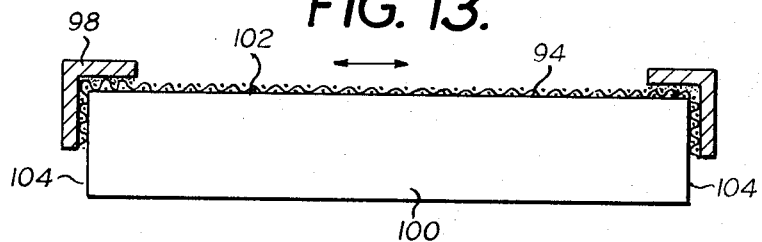
FIG. 13.
FIG. 14.
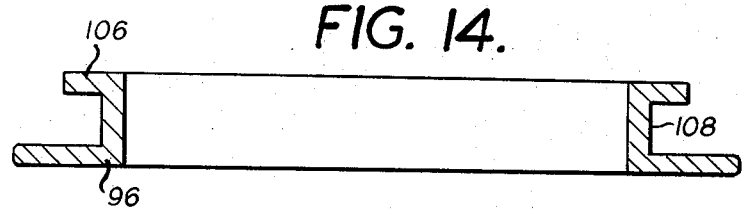
FIG. 15.
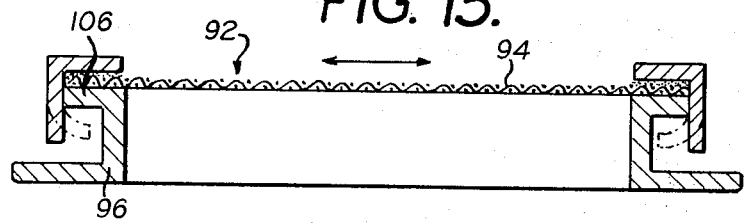
FIG. 19.
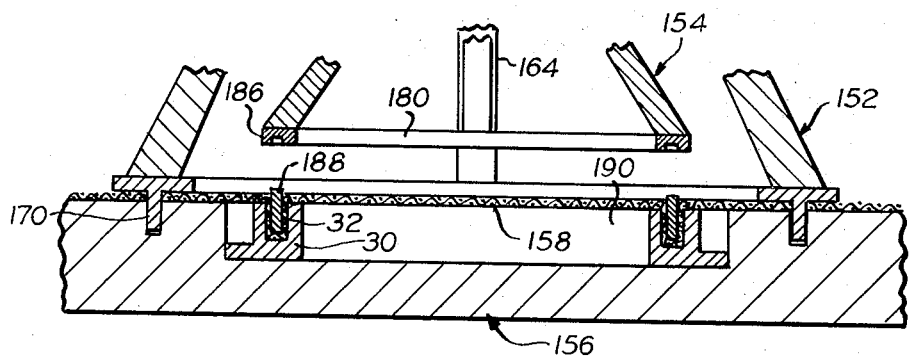

VIBRATORY SEPARATOR SCREENS

BACKGROUND OF THE INVENTION

1. Field of the Invention

This invention relates to vibratory separator screens.

2. Description of the Prior Art

A common form of vibratory separator is disclosed in U.S. Pat. No. 3,463,315 issued on Aug. 26, 1969 to Reisbeck. The separator shown in that patent comprises upper and lower cylindrical members forming chambers therein. The upper member is mounted on springs to the lower member and may be vibrated relative to the lower member by means of an electric motor assembly positioned in the lower chamber. A vibratory screen is mounted in the upper chamber and is vibrated along with the upper chamber. A substance to be processed is fed onto the screen from above as the latter is vibrated. In this manner, desirable or undesirable particles in the substance may be filtered by size and consistency, dependent upon the nature and characteristics of the screen and of the substance.

Common vibratory screens are circular having a diameter usually ranging from 18 inches to 60 inches. In larger units, however, separator screens may have a diameter as large as 100 inches or more. The screen material is preferably a wire mesh cloth which may be synthetic or metallic and which usually has a mesh rating within the range of 1 mesh to 400 mesh, depending upon the nature of the substance to be processed.

It is important in separators to use vibratory screens which are strong and durable and able to withstand the persistent vibrations experienced when processing a substance. Further, it is important for the screen to be maintained in a taut and strongly tensioned manner since separators are usually used to filter a wide variety of substances having a wide variety of weights, consistencies and, if liquids, viscosities. Examples of such substances are sewage, food, sand and gravel, pulp and paper, drugs, ceramics, sugar, paint, clay and petroleum, to name a few.

Various separator screens, as well as their methods of manufacture and assembly are known in the art. In a method of assembling one type of separator screen, for example, a wire cloth blank of desired mesh is clamped on four sides and is then stretched by tightening bolts on a heavy frame. A pair of complementary rings are then mounted to each other on opposite sides of the cloth, such as by spot welding or the like. The periphery of the rings is then appropriately dressed to remove excess cloth.

The above method is complex in nature requiring a significant amount of man-hours to assemble each separator screen with the required degree of tautness. More specifically, the tightening bolts must be individually turned thereby tightening the cloth in increments at different locations. Further, the resultant screen oftentimes lacks uniformity of tension thereby hastening its wear. Such non-uniformity is increased by slippage which is at a minimum in the vicinity of the spot welds and is at a maximum at points intermediate each pair of adjacent spot welds.

Other separator screens and their methods of manufacture are disclosed in the following U. S. Pat. Nos. 3,286,338 issued on Nov. 22, 1966 to Bohr; No. 3,291,164 issued on Dec. 13, 1966 to Swallow; and No. 3,341,013 issued on Sept. 12, 1967 to Moulton. In the Swallow patent, for example, a multi-stage tensioning method is used wherein a wire cloth is tensioned in stages to a desired level of tension. However, the cloth of Swallow is finally tensioned by applying a force directly to the cloth itself which tends to rupture the mesh.

Procedures for manufacturing framed screens other than vibratory separator screens are also known. For example, reference is had to U.S. Pat. No. 2,753,897 issued July 10, 1956 to Conrad. The screen of Conrad is manufactured by assembling a rectangular shaped frame having four discontinuous caulking grooves. Four corresponding splines are placed on a worktable with the wire mesh cloth blank being first cut to proper size, placed on a planar sheet and then draped over the splines. The frame is then moved downwardly onto the cloth with the splines forcing the periphery of the cloth into the grooves of the frame.

The screen of Conrad is used primarily as a window screen which does not require the high degree of tautness that is requisite in vibratory separator screens. Thus, Conrad only uses a single stage tensioning method wherein the tension of the cloth is far less than that required in vibratory screens. Further, Conrad's screens could not be used as vibratory screens even if properly highly tensioned since the corners of the frame would rip through the wire cloth thereby damaging the screen and significantly reducing the tension.

SUMMARY OF THE INVENTION

A number of vibratory separator screens which are each assembled in accordance with a multi-stage tensioning method of this invention. One vibratory separator screen of this invention comprises a frame having a continuous peripheral groove formed therein; a cloth of desired mesh mounted to the frame at a desired level of tension with a segment of the cloth being disposed in the groove; and means bonding the cloth to the frame at said desired level of tension.

A preferred method of fabricating the above screen comprises the steps of tensioning the cloth to a level of tension less than said desired level of tension; positioning the cloth over the frame with a segment of the cloth covering the groove; driving said cloth segment into the groove thereby further tensioning the screen to said desired level; and bonding the screen to the frame at said desired level of tension.

So fabricated, the screen is able to maintain the cloth at a high level of tension for a long period of time since the cloth is first driven into the frame thereby setting up such high level of tension and then the cloth is bonded to the frame at such level.

Another embodiment of a vibratory separator screen of this invention comprises an annular frame including a peripheral side wall; a mounting ring having a generally right-angled cross section with a cloth of desired mesh being secured to the mounting ring, the mounting ring being force fit over the frame side wall so that the cloth is mounted to the frame at said desired level of tension. The preferred method for manufacturing the latter described screen comprises the steps of tensioning said cloth to a first level of tension less than a second desired level of tension; mounting said cloth to the mounting ring at said first level of tension; and force fitting the mounting ring over the frame to thereby mount the cloth to the frame at said second desired level of tension.

These and other aspects and advantages of the present invention shall be more clearly described with reference to the accompanying drawing.

BRIEF DESCRIPTION OF THE DRAWING

FIG. 12 is a fragmentary sectional view of yet another embodiment of a vibratory separator screen of this invention;

FIG. 13 is a cross-sectional view of another annular pretensioning assembly for cloth screens taken along a diametric path through the assembly;

FIG. 14 is a cross-sectional view of an annular frame onto which the pretensioned cloth of FIG. 9 is to be mounted;

FIG. 15 is a cross-sectional view of another embodiment of a separator screen of this invention;

FIG. 19 is a fragmentary sectional view of the assembly of FIG. 16 shown in a fourth stage of operation.

DESCRIPTION OF THE ILLUSTRATED EMBODIMENTS

Figure 1:
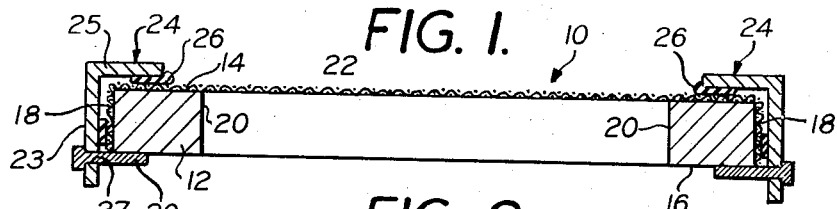
FIG. 1 is a cross-sectional view of an annular pretensioning assembly for cloth screens taken along a diametric path through the assembly.

Referring to FIG. 1, a screen pretensioning assembly 10 is shown which is used to tension a foraminous cloth 22, such as a wire cloth of desired mesh, to a first level of tension in a multi-stage tensioning method of this invention. Assembly 10 includes a mounting piece 12 which is preferably annular in shape and is desirably fabricated of a suitable metal, such as steel. Mounting piece 12 is preferably rectangular or square in cross section as defined by opposing top and bottom surfaces 14 and 16, respectively, which are parallel and planar and each of which extends between a pair of opposing annular side surfaces 18 and 20.

Although the above described shape of mounting piece 12 is preferred, other shapes are contemplated in this invention. In fact, mounting piece 12 may have any cross-sectional shape sufficient to enable wire cloth 22 to be mounted in tension as described in more detail below. Further, mounting piece 12 may be other than annular, such as ovular, or even multi-sided so long as the mounting piece may be placed over an annular frame 30 to which a cloth screen is to be mounted.

Pretensioning assembly 10 further includes a nesting ring 24 preferably having a right-angled cross section defined by intersecting vertical and horizontal segments 23 and 25, respectively. The inner diameter of vertical segment 23 is slightly larger than the outer diameter of mounting piece 12, by an amount substantially equal to the maximum thickness of cloth 22. Further, vertical segment 23 includes a plurality of holes 27 spaced uniformly thereabout (only two being shown). The holes each preferably accommodate a setting bolt 29 to lock the nesting ring to the mounting piece as described hereinafter.

In operation, wire cloth 22 is cut down to a desired size and is then draped over annular mounting piece 12. Then, nesting ring 24 is pushed down about the periphery of mounting piece 12 thereby causing the segment of cloth 22 between rings 12 and 24 to be moved downwardly thereby tensioning the cloth. When horizontal segment 25 of ring 24 engages upper surface 14 of mounting piece 12 (or a gasket 26 disposed on surface 14) bolts 29 are driven through holes 27 to lock ring 14 in place. At this point, cloth 22 is tensioned to a first level of tension which is less than the desired level of tension for cloth 22 as a vibratory screen.

Figure 2:
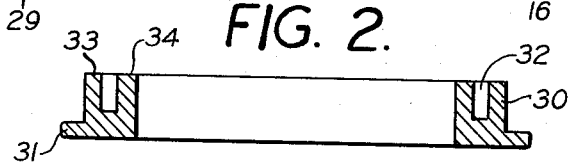
FIG. 2 is a cross-sectional view of an annular frame onto which the pretensioned cloth of FIG. 1 is to be mounted.

Referring to FIG. 2, annular frame 30 is basically a mounting ring which is generally rectangular in cross section having an outwardly extending annular lip 31. Frame 30 is preferably fabricated of a suitable metal, although it may alternatively be fabricated of wood, a plastic, or may include a lamination of plastic and metal. In accordance with this invention, frame 30 is provided with a continuous groove 32 formed therein. Groove 32 is annular and is located intermediate the inner and outer side walls of the frame.

Figure 3:
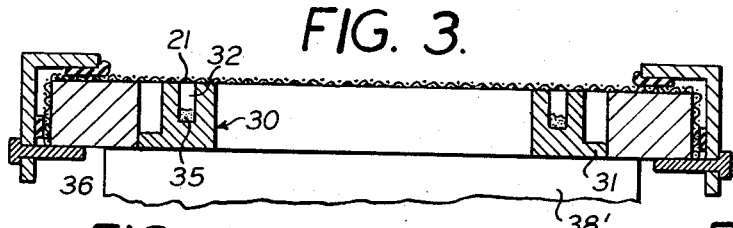
FIG. 3 is a cross-sectional view of the assembly of FIG. 1 shown mounted about the frame of FIG. 2.
Figure 4:
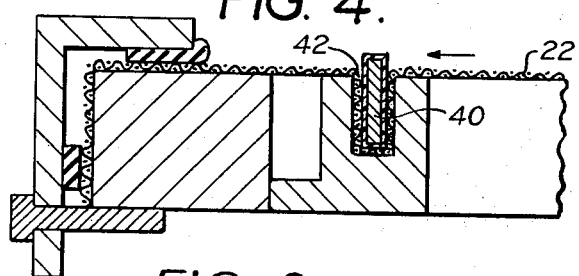
FIG. 4 is an enlarged fragmentary sectional view of the composite assembly of FIG. 3, further showing an annular spline driven into a corresponding annular groove in the frame of FIGS. 2 and 3.
Figure 5:
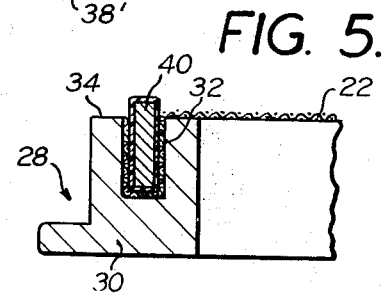
FIG. 5 is an enlarged fragmentary sectional view of one embodiment of a vibratory separator screen of this invention.

The process by which a vibratory separator screen 28 (FIG. 5) of this invention is formed with assembly 10 and frame 30 is now explained with reference to FIGS. 3–5. First, cloth 22 is tensioned on assembly 10 to said first level of tension in the manner above described. Second, groove 32 of of frame 30 is partially filled with a suitable bonding substance 35, which may desirably be cement, although, of course, other suitable bonding substances may be utilized. Third, pretensioning assembly 10 is then placed over frame 30, which frame is supported on a work surface 38. Assembly 10 is also partially supported at lower surface 16 of mounting ring 12 on work surface 38. In this position (FIG. 3), it will be seen that an annular segment 21 of cloth 22 covers groove 32.

An annular spline 40 (FIG. 4) conforming in dimensions to that of annular groove 32 is force driven into groove 32 thereby forcing segment 21 of cloth 22 into the groove. By forcing spline 40 into groove 32, the tension on cloth 22 is increased to the desired level for usage of the cloth in a vibratory environment. A specific apparatus for supporting spline 40 and driving it into groove 32 of frame 30 is described in detail below with reference to FIGS. 16–19. It should be noted, however, that in carrying out the above method of this invention, any conventional apparatus for supporting and driving spline 40 may be employed, or indeed, this may be done by hand.

After the spline is driven in and the bonding agent has had sufficient time to effect a bond between the cloth and the frame within the groove, cloth 22 is cut along the outer edge 42 of groove 32 (FIG. 4) to remove all excess cloth from frame 30. This is followed by a removal of pretensioning assembly 10, and a new piece of cloth may be inserted therein for use in assembling the next vibratory screen. The end product of the above method is vibratory separator screen 28 shown in FIG. 5. It should be noted that cloth 22 of screen 28 is maintained at the desired level of tension substantially for the useful life of the cloth.

In another embodiment of the method of this invention, after a bond has been effected between the cloth and the frame within the groove and the excess cloth has been cut away with assembly 10 being removed, spline 40 is then removed so that it may be reused again in forming another vibratory separator screen. To this end, the height of spline 40 is slightly greater than the depth of groove 32 to facilitate removal thereof, and preferably has an outer surface which will not adhere to bonding agent 35, such as a polytetrafloroethylene ("TEFLON") surface. After the spline is removed, groove 32 is then completely filled with a bonding agent (FIG. 6), to insure that cloth 22 is maintained in groove 32 thereby maintaining the cloth at the proper desired level of tension.

Figure 7:
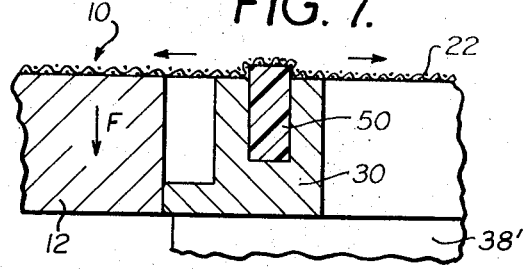
FIG. 7 is a fragmentary sectional view of the assembly of FIG. 1 shown placed over an annular frame used to form yet another embodiment of a vibratory separator screen of this invention.
Figure 8:
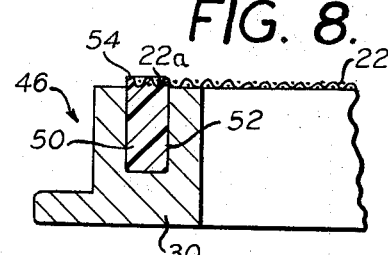
FIG. 8 is a fragmentary sectional view of the vibratory separator screen embodiment formed by the apparatus shown in FIG. 7.

FIG. 8 shows another vibratory separator screen 46 of this invention which is assembled in accordance with yet another embodiment of the multi-stage tensioning method of this invention as illustrated in FIG. 7. Referring to FIGS. 7 and 8, a cloth 22 is tensioned to a first level of tension on a pretensioning assembly 10 which is then slipped over a frame 30, which frame previously has had a plastic spline 50 driven into groove 32 of the frame. In this method, a worktable 38' is used which does not extend under assembly 10 when the latter is placed over frame 30. With assembly 10 so positioned, cloth 22 is in contact with upper surface 54 of spline 50.

Then, a downward force is exerted on pretensioning assembly 10 thereby moving mounting ring 12 downwardly about frame 30. This, of course, causes cloth 22 to stretch thereby further increasing tension in the cloth. When a desired level of tension is reached, further downward progression of mounting ring 12 is stayed and the position of the mounting ring maintained. This may be accomplished manually or by a machine (not shown). At this point, a segment 22a of cloth 22 will be in contact with upper surface 54 of spline 50.

Then, cloth 22 is bonded at segment 22a thereof to the upper surface of the spline. Such bonding is preferably accomplished in accordance with either a conventional induction heating or ultrasonic welding procedure, although the use of epoxy cements is also contemplated, as are other well known bonding procedures. Induction heating and ultrasonic welding processes are old in the art and thus will not be described in detail herein. After the cloth has been bonded, the excess cloth at the outer periphery of spline 50 is trimmed away and the pretensioning assembly then removed. The finished screen 46 is shown in FIG. 8.

It will thus be noted that screen 46 is similar to screens 28 and 44 in that it has an annular frame 30 similar to that of frames 30 of the latter two screens. Further, screen 46 has an annular spline 50 which is identical in shape as spline 40, but is preferably fabricated of a plastic material. In screen 46, a cloth 22 is bonded to an upper surface of the spline instead of being bonded to the frame within the groove. In this manner, the cloth may be easily replaced when worn by removing the spline and replacing it with a new one and then bonding a new cloth thereto in a manner more fully described below.

Figure 9:
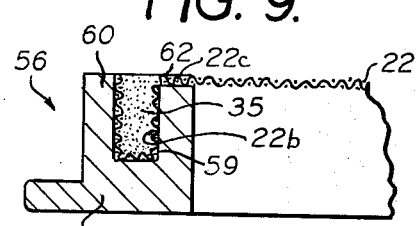
FIG. 9 is a fragmentary sectional view of still another embodiment of a vibratory separator screen of this invention.

Referring now to FIG. 9, another vibratory separator screen 58 of this invention is shown. The method of assembling screen 58 also represents an embodiment of the multi-stage tensioning method of this invention and thus shall also be described in detail.

Separator screen 56 comprises an annular frame 58 which is substantially identical to annular frames 30 of vibratory separator screens 28, 44 and 46 and includes a continuous groove 59 formed in an upper surface 60 of frame 58. Annular frame 58 is preferably fabricated of a suitable metal, such as steel, but includes a laminated continuous segment 62 formed at that portion of upper surface 60 located radially inwardly of groove 59. Laminated segment 62 preferably includes a layer of plastic which is cemented to the metal of frame 58. The upper surface of the plastic is desirably substantially coplanar with upper surface 60 of frame 58. The thickness of the plastic is sufficient to enable a cloth 22 to be imbedded in the plastic upon the application of a conventional ultrasonic welding or induction heat bonding procedure.

Figure 6:
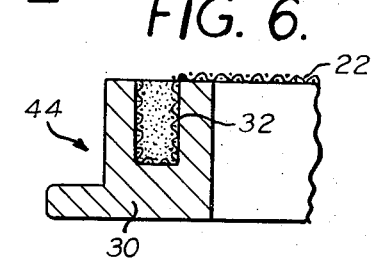
FIG. 6 is a fragmentary sectional view of another embodiment of a vibratory separator screen of this invention.

Separator screen 56 is formed by a multi-stage tensioning method similar in initial steps to the method of fabricating separator screen 44 of FIG. 6. More specifically, cloth 22 is pretensioned, such as on pretensioning assembly 10 of FIG. 1, and is then placed over annular frame 58 with a segment 22b of cloth 22 initially overlying groove 59, the groove having previously been partially filled with a bonding agent 35. Then, a spline (not shown), identical with spline 40 (FIGS. 4–5), is driven into groove 59 thereby forcing segment 22b of cloth 22 into the groove to further tension the cloth to a desired level. The spline is left in the groove a sufficient length of time to enable the cloth to be effectively bonded to the frame within the groove. Once a bond is effected, the spline, which is preferably provided with a "nonstick" outer surface, is removed followed by completely filling the groove with bonding agent 35.

To further insure the permanence of a bond between cloth 22 and frame 58, a segment 22c of screen 22 overlying laminated segment 62 of frame 58 is preferably bonded to the plastic of such lamination, such as by induction heating or ultrasonic welding.

Figure 10:
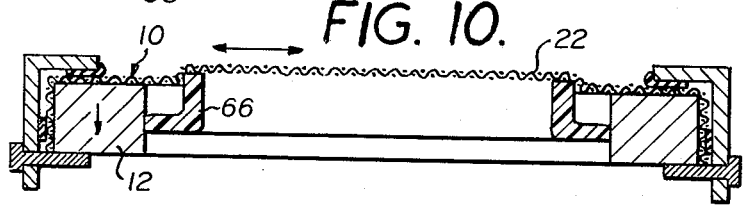
FIG. 10 is a sectional view of the assembly of FIG. 1 shown placed over an annular frame used to form another embodiment of a vibratory separator screen of this invention.
Figure 11:
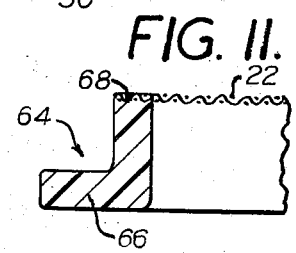
FIG. 11 is a fragmentary sectional view of the vibratory separator screen formed by the apparatus shown in FIG. 10.

Reference is now had to FIGS. 10 and 11 wherein yet another separator screen 64 and the specific multi-stage tensioning method of its manufacture will be described. Separator screen 64 includes an annular frame 66 of L-shaped cross section which is preferably fabricated of a plastic material. Screen 64 includes a wire mesh cloth 22 which is preferably induction heat bonded to an upper surface 68 of the frame 66 at a desired level of tension. Alternatively, if desired, frame 66 may be a laminate consisting of a metallic material to which a plastic layer is bonded, such as laminate segment 62 of frame 58 of separator screen 58.

The method employed in the fabrication of separator screen 64 is substantially identical with that employed in the fabrication of separator screen 46 (FIGS. 7 and 8). More specifically, cloth 22 is first pretensioned, such as on assembly 10 (FIG. 1), and is then placed over frame 68 and then further tensioned to a desired level of tension, such as by pushing down on assembly 10. When the desired level of tension is reached, the annular segment of cloth 22 engaged with upper surface 68 of frame 66 is bonded thereto, preferably by induction heating. Then, the excess cloth is trimmed.

With reference to FIG. 12, another vibratory separator screen 70 and its specific multi-stage tensioning method of manufacture will be described. Separator screen 70 includes an annular frame 72 which is substantially identical to frame 66 of separator screen 64 and may be made of plastic. Instead of having a single wire mesh cloth, such as cloth 22 of screen 64, bonded to an upper surface 80 of frame 72, separator screen 70 includes a twin-screen assembly 74. Twin-screen assembly 74 comprises a pair of wire mesh cloths bonded at their peripheries to upper surface 80 of frame 70, such bonding being accomplished in accordance with a desired bonding technique, such as induction heating, for example. As with each vibratory separator screen of this invention, cloths 76 and 78 are each tensioned to a desired level of tension before being bonded.

Referring now more specifically to twin-screen assembly 74, cloths 76 and 78 are held spaced apart inwardly of frame 72 by one or more annular hoops or rings disposed between cloths 76 and 78 at radially spaced locations. More specifically, and by way of example, twin-screen assembly 74 preferably includes an annular hoop 84 which is preferably circular in cross section and which has a diameter slightly less than the inner diameter of annular frame 72. In this manner, a sufficient distance may be maintained between the hoop and the annular frame to enable cloths 76 and 78 to be drawn together at surface 80 of frame 72 for bonding of both cloths to said surface.

Further, twin-screen 74 includes one or more annular rings 86 (two being shown for purposes of example) having successively smaller circumferences. Thus, rings 86 are each located along a different radial path from axis 82. The purpose of rings 86 is to maintain cloths 76 and 78 in a spaced-apart relationship between hoop 84 and the axis 82.

To increase the efficiency of separator screen 70, it is preferred that lower cloth 78 have a lesser mesh rating than that of upper cloth 76. In other words, cloth 78 has fewer but larger openings than does cloth 76. Further, it is preferred that twin-screen assembly 74 include a plurality of balls 90 which are movably positioned between cloths 76 and 78 at various locations between hoop 84 and rings 86. These balls are of a size only slightly larger than the openings in lower screen 78. Balls 90 are preferably made of hard rubber. When separator screen 70 is vibrated, the balls bounce back and forth between cloths 76 and 78 to dislodge any material wedged in the openings of the cloths.

Vibratory separator screen 70 is preferably manufactured by a method similar to that employed in the manufacture of separator screen 64 (FIG. 11). First, however, a lower cloth 78 is obtained having a desired mesh rating. Then, a desired number of hoops 84 and rings 86 of varying diameters are placed at spaced radial locations about cloth 78 with a plurality of balls 90 being positioned at various locations therebetween. A top cloth 76 preferably having a mesh rating less than that of cloth 78 is placed over the assemblage of hoops 84, rings 86 and balls 90.

Then, a pretensioning apparatus, such as pretensioning assembly 10 (FIG. 1), may be used to tension cloths 76 and 78 of twin screen assembly 74 to a first level of tension less than a desired level. This may be done by clamping the periphery of cloths 76 and 78 onto mounting piece 12 in the manner above described with respect to the assembly of separator screen 10. Next, the pretensioned twin screen assembly is placed over frame 72 (mounting piece 12 being of greater inner diameter than the outer diameter of frame 72) with a downward force being exerted on mounting piece 12. This further stretches cloths 76 and 78 until the desired level of tension is reached at which point cloths 76 and 78 are bonded in superimposed relation to an upper surface 80 of frame 72. As before, induction heating or ultrasonic welding techniques are preferred. Of course, as soon as a bond is effected, excess cloths are trimmed and the pretensioning assembly removed.

It is to be noted that frame 72 is not the only frame that may be used to fabricate a twin-screen vibratory separator screen. For example, a frame similar to frame 30 (FIG. 2) may be used to form such a screen in accordance with a method calling for final tensioning by driving cloths 76 and 78 into an appropriately dimensioned groove.

Reference is now had to FIGS. 13-15 wherein another vibratory separator screen 92 of this invention, together with its method of manufacture, will be described. Referring to FIG. 15, separator screen 92 comprises a wire cloth 94 of desired mesh which is mounted at a desired level of tension to an annular frame 96. As best shown in FIG. 13, cloth 94 is first bonded to an annular ring 98 which is of right-angled cross section.

To pretension and bond cloth 94 to ring 98, cloth 94 is draped over a worktable 100 having a substantially planar upper surface 102 which is preferably coated with a "non-stick" substance. Worktable 100 also includes a peripheral side wall 104 which is perpendicular to upper surface 102. The diameter of worktable 100 is slightly less than the inner diameter of the vertical segment of ring 98. Then, a bonding material, such as epoxy cement, is spread over the inner surface of the horizontal segment of ring 98, which ring is then pushed down onto and around worktable 100. As ring 98 is moved downwardly, it will be noted that the periphery of cloth 94 (sandwiched between side wall 104 and ring 98) will be correspondingly forced downwardly along the side wall thereby stretching and tensioning the cloth to a level of tension less than a desired level. When the epoxy has hardened to effect a bond between cloth 94 and ring 98, the ring and cloth assembly is removed from worktable 100. Then, the excess cloth not bonded to the ring is removed (e.g. that portion overlying the vertical segment of the ring).

Referring to FIGS. 14 and 15, annular frame 96 of vibratory screen 94 preferably includes an annular lip 106 which extends radially outward from the upper end of a peripheral side wall 108 of the frame, the upper surface of lip 106 being essentially coplanar with the upper surface of the remainder of frame 96. It is further preferred that the downward extent of lip 106 be approximately about one-third the downward extent of the vertical segment of ring 98. It is necessary, in accordance with this invention, that the outer diameter of lip 106 be no less than, and preferably greater than, the inner diameter of the vertical segment of ring 98 so that ring 98 may be pressed over frame 96 only by a force fit.

With specific reference to FIG. 15, cloth 94, which has been pretensioned on ring 98, is mounted to frame 96 at a desired level of tension greater than its pretensioned level by force fitting ring 98 at its vertical segment over frame 96 at lip 106 thereof. Ring 98 is then preferably crimped at the lower extent of its vertical segment to insure that ring 98 will not jar loose during vibration of the vibratory separator screen. Such crimping is not essential to this invention, however. For example, if the force fit is sufficiently tight, there need not be crimping. Also, instead of crimping, the lower extent of the vertical segment of ring 98 may be banded about frame 96.

It should be noted, as pointed out above, that each of the vibratory separator screens of this invention may be used as part of a sewage treatment process. More specifically, during vibration of the screen, the sewage sludge may be separated from the water content thereof.

This invention is also directed to an apparatus which may be used to perform the multi-stage tensioning method of assembling vibratory separator screens 28, 44 and 56.

Figure 16:
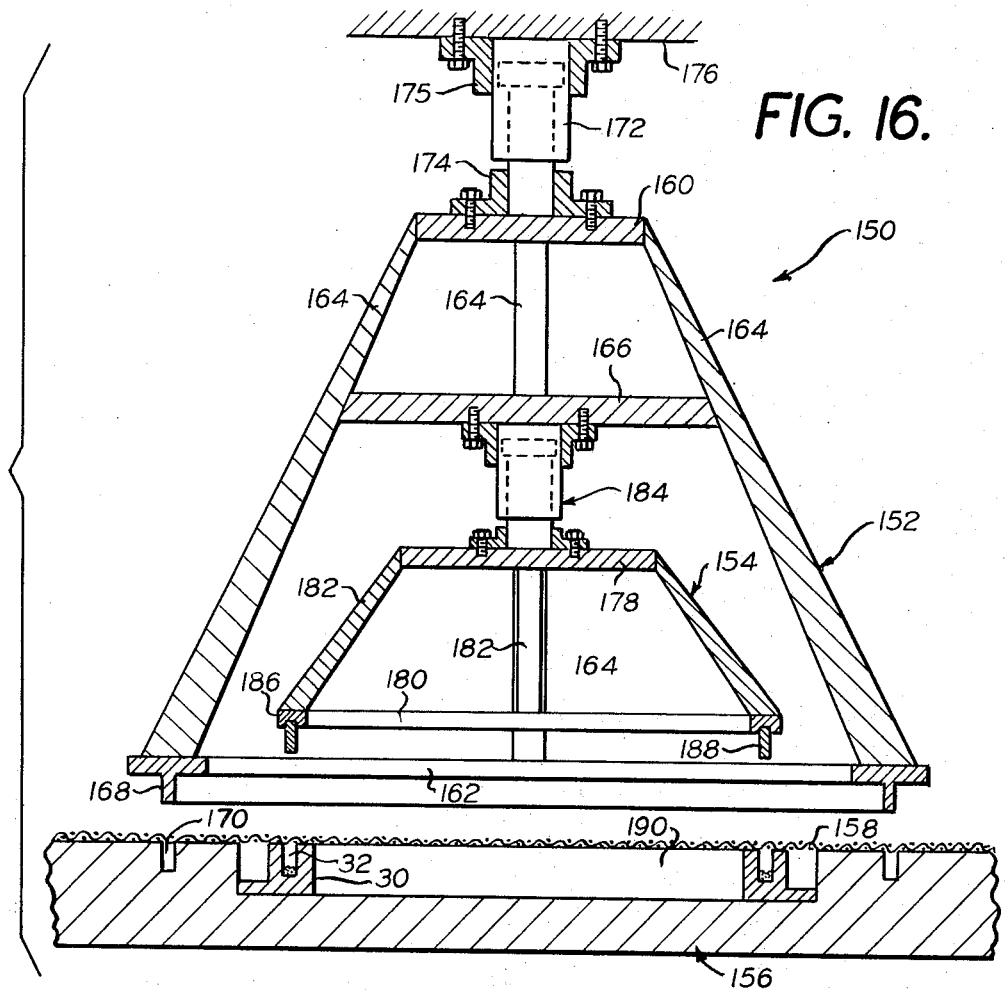
FIG. 16 is a side cross-sectional view, partly in elevation, of a hydraulic cloth screen tensioning apparatus of this invention with said apparatus shown in a first stage of operation.

Referring now to FIG. 16, assembling device 150 includes a primary tensioning rig 152 and a secondary tensioning rig 154 which are each independently movable relative to a worktable 156. The purpose of primary tensioning rig 152 to tension a cloth 158 (FIGS. 17-19) of desired mesh to a first level of tension less than a desired level, with the purpose of secondary tensioning rig 154 being to finally tension cloth 158 to said desired level.

Primary tensioning rig 152 is preferably a three tier structure which is shaped like a truncated cone. The top of rig 152 is defined by a circular plate 160 and the bottom by an annular ring 162, the ring being of greater diameter than plate 160. Plate 160 and ring 164 are preferably connected at their peripheries by a plurality of struts 164. Most preferably, there are four struts 164 spaced at 90° intervals about the peripheries of disc 160 and ring 162. It is also preferred that a second plate 166 be included as a brace, plate 166 being disposed between plate 160 and ring 162 and parallel with plate 160.

In accordance with this invention, ring 162 includes a downwardly extending annular flange 168. Flange 168 is designed to drive a segment of cloth 158 into a complementary annular groove 170 formed in worktable 156 to thereby place the cloth in tension.

Figure 17:
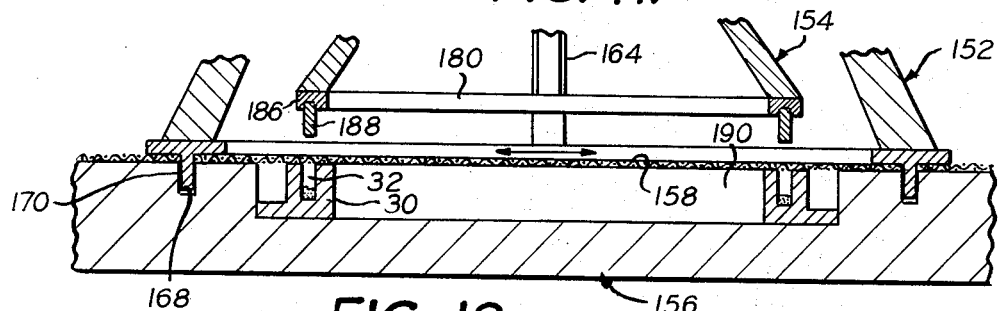
FIG. 17 is a fragmentary sectional view of the assembly of FIG. 16 shown in a second stage of operation.

Plate 160 of primary tensioning rig is preferably mounted to the piston of a conventional hydraulic ram 172 (shown in elevation) by means of a conventional mounting assembly 174. Further, the cylinder of ram 172 is preferably mounted via a conventional mounting assembly 175 to a support surface 176 located above and parallel to plate 160. Ram 172 is positioned so that flange 168 of ring 162 is always aligned with groove 170 and is slightly above worktable 156 when ram 172 is unextended (FIG. 16). Further, ram 172 may be extended to move tensioning rig 152 toward table 156 to position flange 168 in groove 170 (FIG. 17).

Secondary tensioning rig 154 is preferably a two tier structure formed by a top plate 178 and a bottom annular ring 180 which are mounted together at their peripheries by a plurality of spaced struts 182 in a manner similar to primary tensioning rig 152. Plate 178 of secondary tensioning rig 154 is preferably mounted to the piston of a hydraulic ram 184, the cylinder of which is mounted to plate 166 of rig 154. Rig 154 is smaller in dimensions than rig 152 and is preferably accommodated between plate 166 and ring 162 of rig 152 when ram 184 is unextended (FIG. 16).

Ring 180 of rig 154 includes an annular groove 186 formed therein and facing table 156. Groove 186 is dimensioned to receive an annular spline 188 therein. The fit between spline 188 and groove 186 is not a tight one, so as to be easily removed therefrom. The significance of this is explained below.

Figure 18:
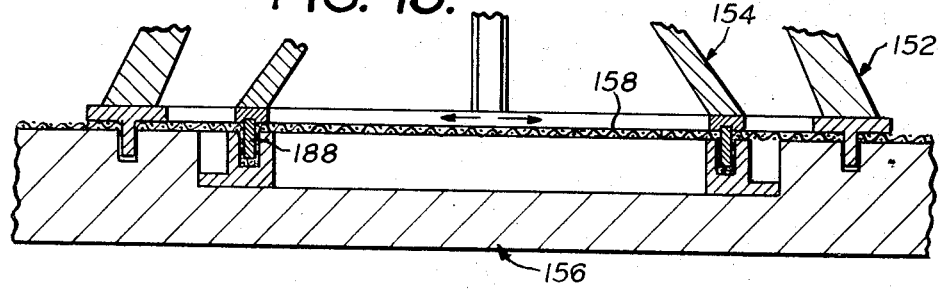
FIG. 18 is a fragmentary sectional view of the assembly of FIG. 16 shown in a third stage of operation.

Worktable 156 includes a circular indentation 190 in which an annular frame having a continuous groove therein, such as frame 30 (FIG. 2), is positioned, the diameter of indentation 190 preferably being equal to the outer diameter of frame 30. It is important that ring 180 and spline 188 of rig 154 be dimensioned so that spline 188 will be aligned with groove 32 of frame 30. Further, ram 184 may be extended to force down rig 154 thereby driving spline 188 into groove 32 of frame 30 to further tension the cloth to be desired level (FIG. 18).

In operation, frame 30 has its groove 32 partially filled with a bonding agent and the frame is then placed in indentation 190 of worktable 156. Then, cloth 158 is draped over worktable 156 (FIG. 16) with, rig 152 then being lowered to drive flange 168 into groove 170 thereby pretensioning the cloth (FIG. 17). Rig 154 is then lowered to drive spline 188 into groove 32 of frame 30 thereby finally tensioning the cloth (FIG. 18). After this final tensioning step, secondary tensioning rig 154 is raised wherein spline 188 is left in groove 32 (FIG. 19). The reason spline 188 remains is that the friction between the spline and frame 30 is far greater than that between the spline and ring 180.

Then, the cloth is preferably cut outwardly of spline 188 and the primary tensioning rig is raised. The newly formed separator screen (e.g. screen 28) is removed from worktable 156 and then cleared of excess cloth. The process may be repeated by draping another cloth 158 over table 156 and inserting a new spline 188 in ring 180.

Device 150, as above constituted and operated, may be used to perform the initial steps in assembling vibratory separator screens 44 and 56 of this invention, as well as screen 28. As will be recalled, in each of the latter screens, a cloth is pretensioned over a frame having a groove therein, and then a segment of the cloth is driven into the groove.

Although the present invention has been described with reference to a number of specifically illustrated embodiments, the invention is not to be so limited. Rather, this invention is deemed to include obvious modifications and alterations to the embodiments specifically illustrated in the drawings.

For example, and with reference to separator screens 28 (FIG. 5), 44 (FIG. 6) and 46 (FIG. 8), it is not essential for the continuous caulking groove in each to be formed beneath an upper surface of frame 30. Thus, the groove may be formed in the outer peripheral side wall into which a segment of cloth 22 may be driven with equivalent results.

Other obvious modifications and changes to the specific embodiments above described are also contemplated in this invention, the precise scope of which is to be defined by the following claims.

What I claim is:

1. A vibratory screen comprising: a frame having an aperture therein and a surrounding member having an inner most peripheral portion which defines said aperture, said surrounding member having a continuous peripheral groove therein; a foraminous cloth spanning said aperture and mounted to the frame at a predetermined level of tension capable of withstanding a predetermined level of imparted vibration, said cloth having a segment thereof disposed in said groove substantially along the inner peripheral walls defining said groove, a spline wedged in said groove, said cloth segment being disposed between said spline and said groove peripheral walls and wedged there between to at least initially provide said predetermined tension level, said walls comprising a bottom wall and a pair of upstanding side walls and means disposed along at least said groove bottom wall for fixedly bonding the cloth segment wedged within said groove to the frame to thereby maintain the cloth at said initially provided predetermined level of tenion.

2. The screen of claim 1, wherein the bonding means includes an adhesive bonding agent disposed within the groove and bonding the cloth segment to the frame within the groove.

3. The screen of claim 2, wherein the bonding agent and cloth segment are disposed substantially along the entire length of the groove inner peripheral walls.

4. The screen of claim 2, wherein a portion of the frame is fabricated of a heat deformable material and wherein the screen further includes bonding means for bonding another segment of said cloth by embedding said other segment in said portion.

* * * * *